(12) United States Patent
O'Sullivan et al.

(10) Patent No.: US 8,230,028 B2
(45) Date of Patent: Jul. 24, 2012

(54) PROPAGATION CONTROL SYSTEM AND METHOD

(75) Inventors: Patrick Joseph O'Sullivan, Ballsbridge (IE); Kieran Anthony Deegan, Summerhill (IE); Edith Helen Stern, Yorktown Heights, NY (US); Robert Cameron Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 12/415,364

(22) Filed: Mar. 31, 2009

(65) Prior Publication Data

US 2010/0250686 A1    Sep. 30, 2010

(51) Int. Cl.
*G06F 15/16*    (2006.01)

(52) U.S. Cl. .................................................. 709/206
(58) Field of Classification Search .................. 709/206
See application file for complete search history.

(56) References Cited

U.S. PATENT DOCUMENTS

| | | | |
|---|---|---|---|
| 2003/0233410 A1* | 12/2003 | Gusler et al. | 709/206 |
| 2008/0086530 A1* | 4/2008 | Gandhi et al. | 709/206 |

* cited by examiner

*Primary Examiner* — Kyung H Shin
(74) *Attorney, Agent, or Firm* — Winstead, P.C.

(57) ABSTRACT

An email message that is addressed to a plurality of recipients is defined on a first client electronic device. A first set of downstream response rights is assigned, on the first client electronic device, to a first recipient chosen from the plurality of recipients. A second set of downstream response rights is assigned, on the first client electronic device, to a second recipient chosen from the plurality of recipients. The second set of downstream response rights is different from the first set of downstream response rights.

17 Claims, 4 Drawing Sheets

PROPAGATION CONTROL SYSTEM AND METHOD

BACKGROUND OF THE INVENTION

The present invention relates in general to computer systems and, more particularly, to email delivery systems.

Email systems are used as a general tool for broad-based collaboration. Modern email systems, which have evolved from the traditional one-on-one postal mail messaging paradigm, led to an explosion of messaging in which many people copy, respond to, forward, and propagate messages.

BRIEF SUMMARY OF THE INVENTION

In a first implementation, a method includes defining an email message on a first client electronic device that is addressed to a plurality of recipients. A first set of downstream response rights is assigned, on the first client electronic device, to a first recipient chosen from the plurality of recipients. A second set of downstream response rights is assigned, on the first client electronic device, to a second recipient chosen from the plurality of recipients. The second set of downstream response rights is different from the first set of downstream response rights.

In another implementation, a computer program product for assigning downstream rights includes a computer readable storage medium including computer usable program code embodied therewith. The computer usable program code includes computer usable program code configured to define an email message on a first client electronic device that is addressed to a plurality of recipients. A first set of downstream response rights is assigned, on the first client electronic device, to a first recipient chosen from the plurality of recipients. A second set of downstream response rights is assigned, on the first client electronic device, to a second recipient chosen from the plurality of recipients. The second set of downstream response rights is different from the first set of downstream response rights.

In another implementation, a client electronic device includes at least one processor and at least one memory architecture coupled with the at least one processor. A first software module is executed on the at least one processor and the at least one memory architecture. The first software module is configured to define an email message that is addressed to a plurality of recipients. A second software module is executed on the at least one processor and the at least one memory architecture. The second software module is configured to assign a first set of downstream response rights to a first recipient chosen from the plurality of recipients. A third software module is executed on the at least one processor and the at least one memory architecture. The third software module is configured to assign a second set of downstream response rights to a second recipient chosen from the plurality of recipients. The second set of downstream response rights is different from the first set of downstream response rights.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE INVENTION

Figure 1:
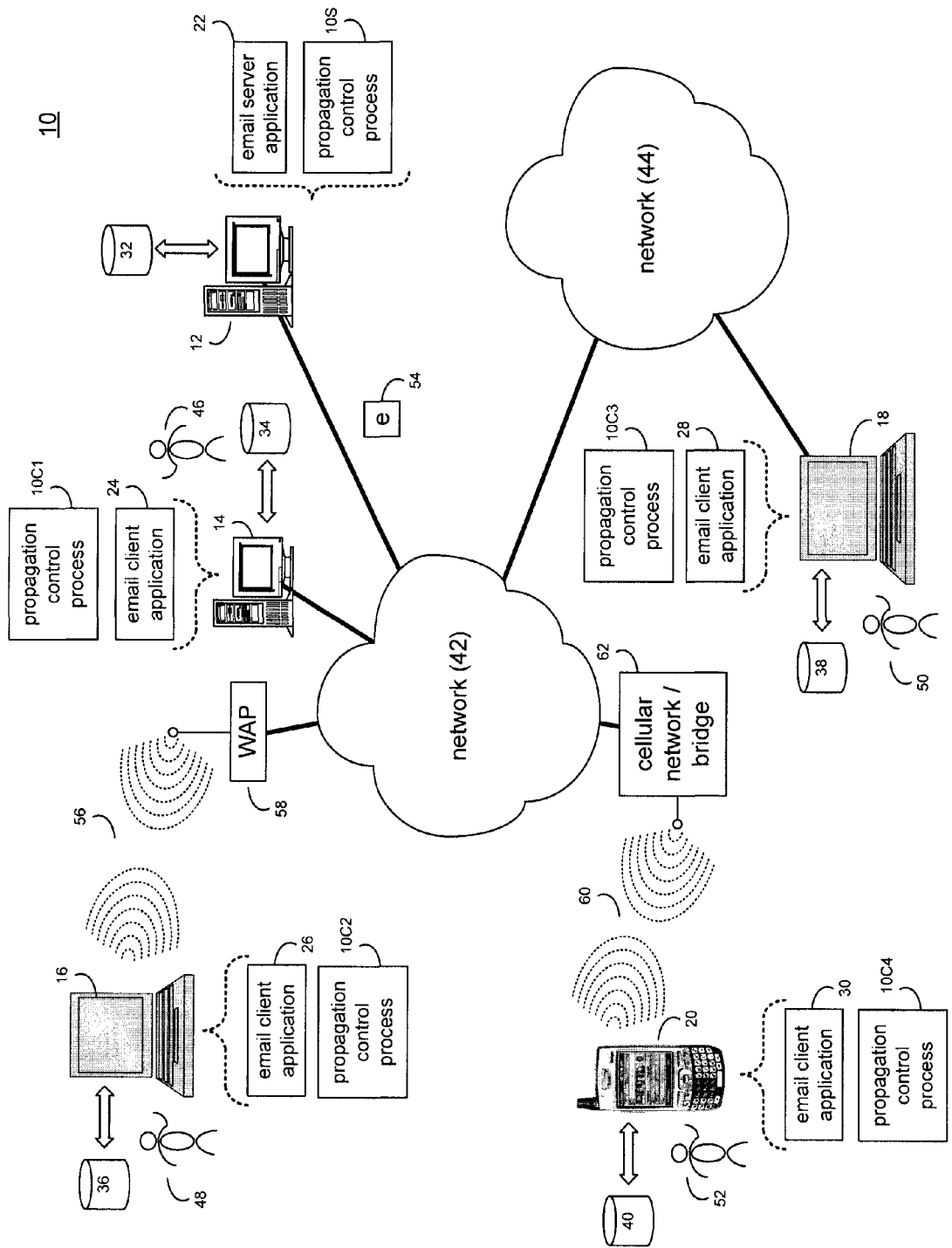
FIG. 1 is a diagrammatic view of a propagation control process coupled to a distributed computing network.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown propagation control process 10 that (as will be discussed below in greater detail) may define an email message that is addressed to a plurality of recipients. A first set of downstream response rights may be assigned to a first recipient chosen from the plurality of recipients. A second set of downstream response rights may be assigned to a second recipient chosen from the plurality of recipients. The second set of downstream response rights may be different from the first set of downstream response rights.

Propagation control process 10 may be a server-side process (e.g., server-side propagation control process 10S) executed on server computer 12 (e.g., a personal computer, a server computer, a series of server computers, a mini computer, and a mainframe computer). Alternatively, propagation control process 10 may be a client side process (e.g., client-side propagation control process 10C1, client-side propagation control process 10C2, client-side propagation control process 10C3, client-side propagation control process 10C4) executed on a client electronic device (e.g., desktop computer 14, laptop computer 16, notebook computer 18, and personal digital assistant 20, respectively). Further, propagation control process 10 may be a hybrid server-side/client-side process that e.g., utilizes server-side propagation control process 10S and one or more of client-side propagation control process 10C1, client-side propagation control process 10C2, client-side propagation control process 10C3, and client-side propagation control process 10C4 to effectuate the functionality of propagation control process 10.

Additionally, propagation control process 10 may incorporate all or a portion of an email server application (e.g., email server application 22), examples of which may include but are not limited to IBM® Lotus® Domino® and Microsoft® Exchange® email server applications and/or an email client application (e.g., email client applications 24, 26, 28, 30), examples of which may include but are not limited to IBM Lotus Notes® and Microsoft Outlook® email client applications (IBM, Lotus, Domino and Notes are registered trademarks of International Business Machines Corporation in the United States, other countries or both; and Microsoft, Exchange and Outlook are registered trademarks of Microsoft Corporation in the United States, other countries or both). Alternatively, propagation control process 10 may be included within or a portion of (e.g., a plugin/applet of) email server application 22 and/or email client applications 24, 26, 28, 30.

The instruction sets and subroutines of server-side propagation control process 10S, which may be configured as one or more software modules and may be stored on storage device 32 coupled to server computer 12, may be executed by one or more processors (not shown) and one or more memory architectures (not shown) incorporated into server computer 12. Examples of storage device 32 may include but are not limited to: a hard disk drive; a tape drive; an optical drive; a RAID array; a random access memory (RAM); and a read-only memory (ROM).

The instruction sets and subroutines of client-side propagation control process 10C1, which may be configured as one or more software modules and may be stored on storage device 34 coupled to desktop computer 14, may be executed by one or more processors (not shown) and one or more memory architectures (not shown) incorporated into desktop computer 14. Examples of storage device 34 may include but are not limited to: hard disk drives; tape drives; optical drives; RAID arrays; random access memories (RAM); read-only memories (ROM), compact flash (CF) storage devices, secure digital (SD) storage devices, and memory stick storage devices.

The instruction sets and subroutines of client-side propagation control process 10C2, which may be configured as one or more software modules and may be stored on storage device 36 coupled to laptop computer 16, may be executed by one or more processors (not shown) and one or more memory architectures (not shown) incorporated into laptop computer 16. Examples of storage device 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices.

The instruction sets and subroutines of client-side propagation control process 10C3, which may be configured as one or more software modules and may be stored on storage device 38 coupled to notebook computer 18, may be executed by one or more processors (not shown) and one or more memory architectures (not shown) incorporated into notebook computer 18. Examples of storage device 38 may include but are not limited to: hard disk drives; tape drives; optical drives; RAID arrays; random access memories (RAM); read-only memories (ROM), compact flash (CF)

storage devices, secure digital (SD) storage devices, and memory stick storage devices.

The instruction sets and subroutines of client-side propagation control process 10C4, which may be configured as one or more software modules and may be stored on storage device 40 coupled to personal digital assistant 20, may be executed by one or more processors (not shown) and one or more memory architectures (not shown) incorporated into personal digital assistant 20. Examples of storage device 40 may include but are not limited to: hard disk drives; tape drives; optical drives; RAID arrays; random access memories (RAM); read-only memories (ROM), compact flash (CF) storage devices, secure digital (SD) storage devices, and memory stick storage devices.

Desktop computer 14, laptop computer 16, notebook computer 18, and personal digital assistant 20 may each execute an operating system, examples of which may include but are not limited to Microsoft Windows®, Microsoft Windows CE, Red Hat® Linux®, or a custom operating system (Windows is a registered trademarks of Microsoft Corporation in the United States, other countries or both; Redhat is a registered trademark of Red Hat Corporation in the United States, other countries or both; and Linux is a registered trademark of Linus Torvalds in the United States, other countries or both).

One or more of server computer 12, desktop computer 14, laptop computer 16, notebook computer 18, and personal digital assistant 20 may be coupled to one or more distributed computing networks (e.g., networks 42, 44) that effectuate the communication of server computer 12, desktop computer 14, laptop computer 16, notebook computer 18, and personal digital assistant 20. Examples of network 42, 44 may include, but are not limited to one or more of: a local area network; a wide area network; a wireless network, an intranet, an extranet, or the internet, for example.

Via the combination of email client applications 24, 26, 28, 30 and email server application 22, users 46, 48, 50, 52 may be allowed to compose and send email messages (e.g., email message 54) to one another.

Users 46, 48, 50, 52 may access email server application 22 directly through the device on which the email client application (e.g., email client applications 24, 26, 28, 30) is executed, namely client electronic devices 14, 16, 18, 20, for example. Users 46, 48, 50, 52 may access email server application 22 directly through network 42 or indirectly through network 44.

The various client electronic devices may be directly or indirectly coupled to network 42 (or network 44). For example, personal computer 14 is shown directly coupled to network 42 via a hardwired network connection. Further, notebook computer 18 is shown directly coupled to network 44 via a hardwired network connection. Laptop computer 16 is shown wirelessly coupled to network 42 via wireless communication channel 56 established between laptop computer 16 and wireless access point (i.e., WAP) 58, which is shown directly coupled to network 42. WAP 58 may be, for example, an IEEE 802.11a, 802.11b, 802.11g, Wi-Fi, and/or Bluetooth device that is capable of establishing wireless communication channel 56 between laptop computer 16 and WAP 58. Personal digital assistant 20 is shown wirelessly coupled to network 42 via wireless communication channel 60 established between personal digital assistant 20 and cellular network/bridge 62, which is shown directly coupled to network 42.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, propagation control process 10 is going to be described as a server-side process (e.g., server-side propagation control process 10S) that is executed on server computer 12. However, this is not intended to be a limitation of this disclosure since (as discussed above) propagation control process 10 may be a client-side process (e.g., client-side propagation control process 10C1, client-side propagation control process 10C2, client-side propagation control process 10C3, client-side propagation control process 10C4) or a hybrid server-side/client-side process that e.g., utilizes server-side propagation control process 10S and one or more of client-side propagation control process 10C1, client-side propagation control process 10C2, client-side propagation control process 10C3, and client-side propagation control process 10C4 to effectuate the functionality of propagation control process 10.

Figure 2:
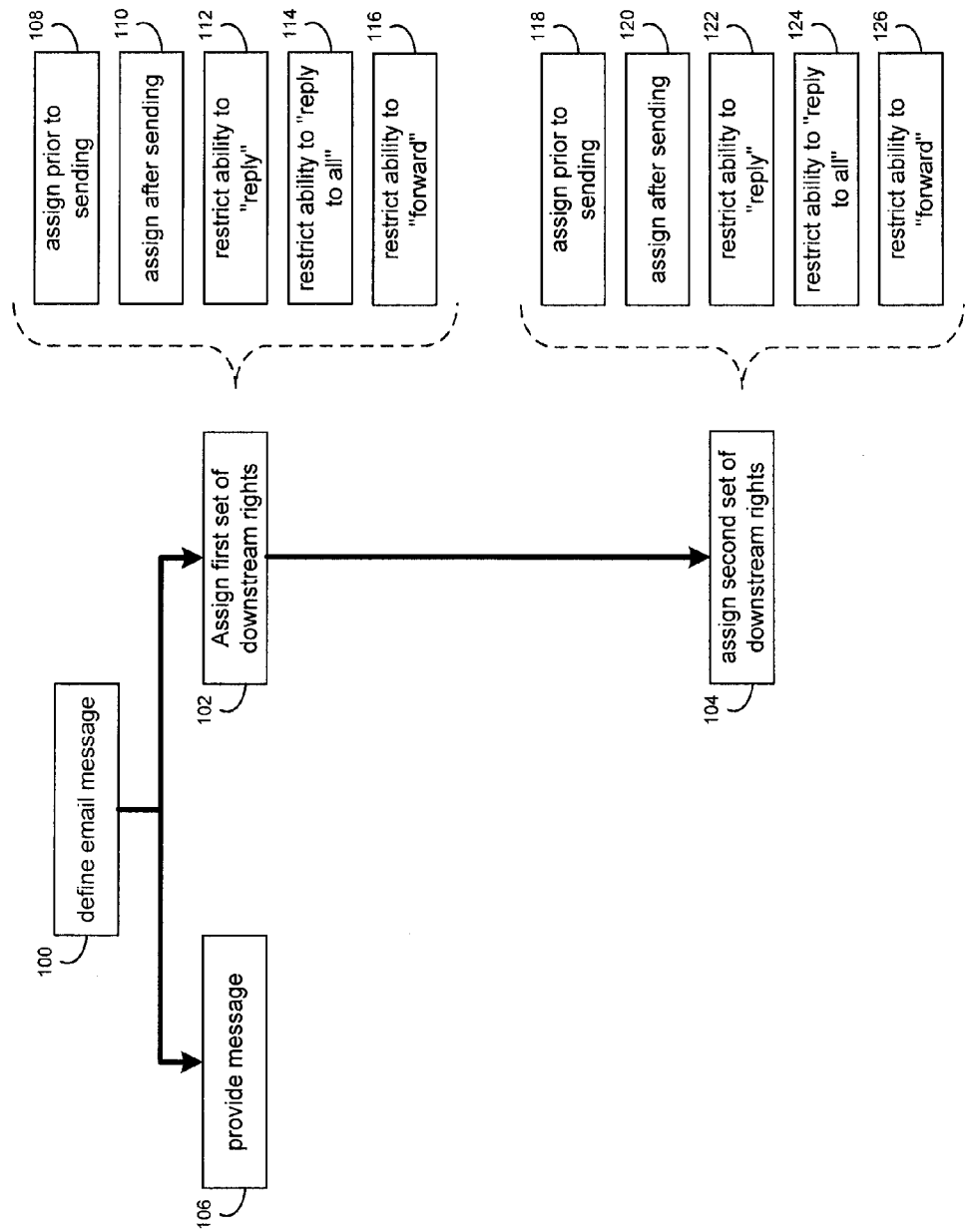
FIG. 2 is a flowchart of the propagation control process of FIG. 1.

Referring also to FIG. 2 and as discussed above, propagation control process 10 may generally provide a method for defining a unique set of downstream response rights for each recipient of an email message. The method may include defining an email message on a first client electronic device that is addressed to a plurality of recipients (at process block 100). Defining the email message may include allowing a user to define the subject of the email message and allowing a user to define the body of the email message. Additionally, the method may allow the user to define a plurality of intended recipients for the email message. The intended recipients may include "to" recipients; "cc" recipients, and "bcc" recipients. The method may include assigning, on the first client electronic device, a first set of downstream response rights to a first recipient chosen from the plurality of recipients (at process block 102). Further, the method may include assigning, on the first client electronic device, a second set of downstream response rights to a second recipient chosen from the plurality of recipients (at process block 104). Additionally, the second set of downstream response rights assigned may be different from the first set of downstream response rights assigned. Accordingly, the method may allow an email message to be defined that is addressed to a first recipient and a second recipient, wherein the first recipient has different downstream response rights than those assigned to the second recipient.

Once properly defined, the method may provide the email message to a plurality of client electronic devices associated with the plurality of recipients (at process block 106). The email message may be provided to various client electronic devices via wired or wireless communication means (as discussed above).

When assigning the first set of downstream response rights to the first recipient chosen from the plurality of recipients (at process block 102), the first set of downstream response rights may be assigned by the method prior to sending the email message to the plurality of recipients (at process block 108) or the first set of downstream response rights may be assigned by the method subsequent to sending the email message to the plurality of recipients (at process block 110).

When assigning the first set of downstream response rights to the first recipient (at process block 102), the method may allow the user to restrict the ability of the first recipient to "reply" to the email message (at process block 112); restrict the ability of the first recipient to "reply to all" to the email message (at process block 114); and restrict the ability of the first recipient to "forward" the email message (at process block 116).

Similarly, when assigning the second set of downstream response rights to the second recipient chosen from the plurality of recipients (at process block 104), the second set of downstream response rights may be assigned by the method prior to sending the email message to the plurality of recipients (at process block 118) or the second set of downstream response rights may be assigned by the method subsequent to sending the email message to the plurality of recipients (at process block 120).

When assigning the second set of downstream response rights to the second recipient (at process block 104), the method may allow the user to restrict the ability of the second recipient to "reply" to the email message (at process block 122); restrict the ability of the first recipient to "reply to all" to the email message (at process block 124); and restrict the ability of the first recipient to "forward" the email message (at process block 126).

Accordingly, the method may allow the user to define an email message addressed to a first recipient and a second recipient, wherein the first recipient has a first set of downstream response rights that allows the first recipient to e.g., only forward the email message, while the second recipient has a second set of downstream response rights that allows the second recipient to e.g., only reply to the email message. Accordingly, a unique set of downstream response rights may be assigned to each recipient of the email message.

For the following discussion of exemplary implementations, propagation control process 10 is going to be described as a server-side process that may interface with or be included within an email server application (e.g., email server application 22). The combination of propagation control process 10 and email server application 22 may interface with one or more email client applications 24, 26, 28, 30 and effectuate the generation/delivery of email messages and the definition of downstream response rights for those messages. However and as discussed above, this exemplary implementation is only one of several possible implementations, and should not be construed as a limitation of the present disclosure.

Figure 3:
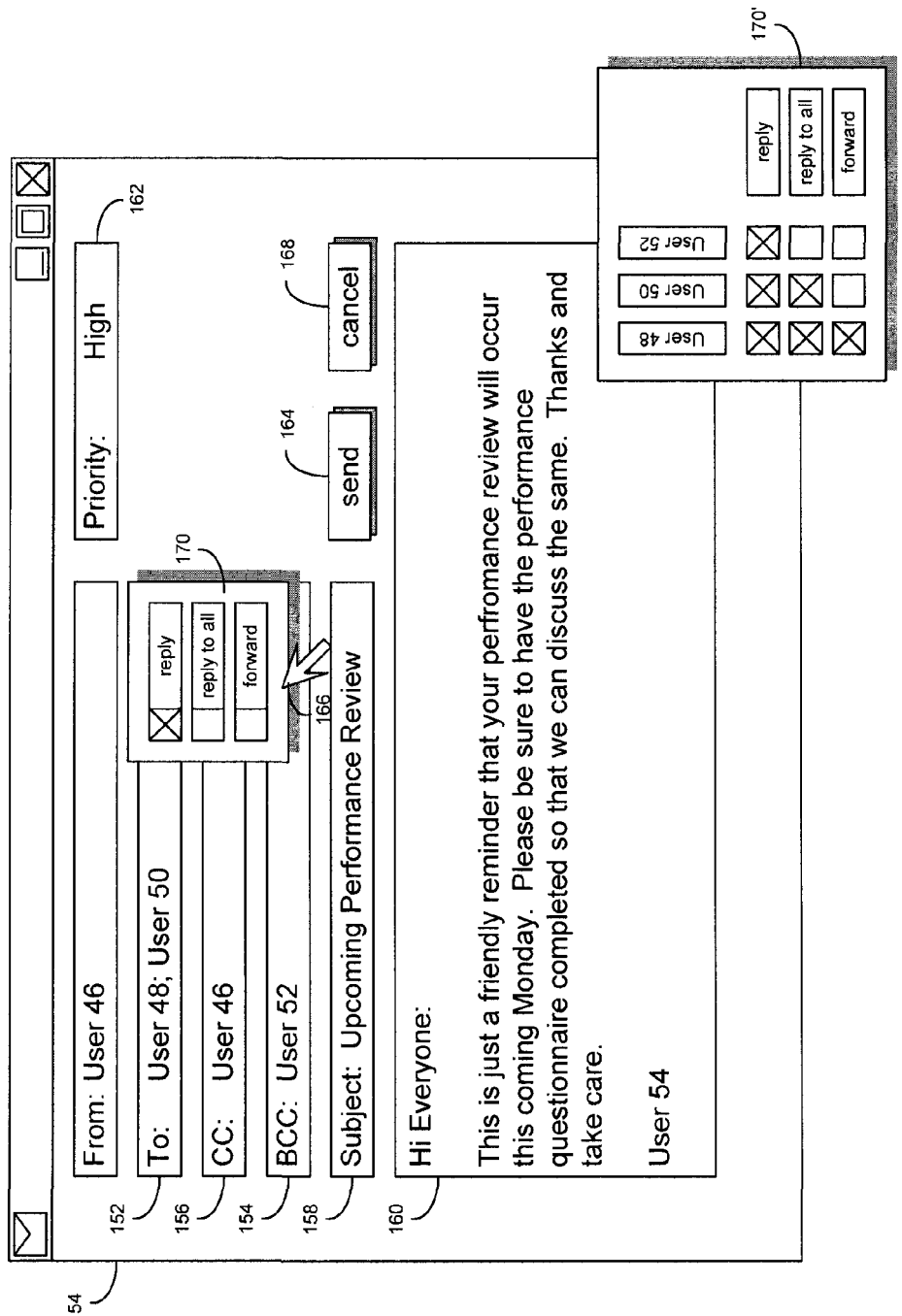
FIG. 3 is a diagrammatic view of an email message being composed by a user of the propagation control process of FIG. 1.

Referring also to FIG. 3, assume for illustrative purposes that user 46 wishes to send email message 54 to users 48, 50. Further, assume that user 46 wishes to blind carbon copy (i.e., BCC) user 52, who is the supervisor of user 46. Accordingly, propagation control process 10 (alone or in combination with email server application 22) may allow user 46 to define email message 54. When defining email message 54, user 46 may address email message 54 to one or more intended recipients. For example, user 46 may enter the email address of users 48, 50 into "To" field 152, and may enter the email address of user 52 into "BCC" field 154. Additionally, user 46 may enter the email address of user 46 into CC field 156 if user 46 wishes to receive a copy of email message 54.

Via propagation control process 10 (alone or in combination with email server application 22), user 46 may also define the subject for email message 54 (i.e., within subject field 158), the body of email message 54 (i.e., within message field 160), and the priority of email message 54 (i.e., within priority field 162). Once user 46 completely defines email message 54, user 46 may select send button 164 via onscreen pointer 166 that is controllable by a pointing device (e.g., a mouse; not shown). Once send button 164 is selected, email message 54 may be provided to users 46, 48, 50, 52 via email server application 22 and one or more of distributed computing networks 42, 44. Alternatively, user 46 may select cancel button 168 to delete email message 54.

Since user 52 is BCC'd on email message 54, the presence of user 52 on this email thread is not known to users 48, 50. Unfortunately, in the event that, upon receiving email message 54 from email server application 22, user 52 selects "reply to all", a copy of the response by user 52 may be sent to all users (e.g., users 46, 48, 50). Accordingly, the presence of user 52 would be known to users 48, 50.

Accordingly, propagation control process 10 (alone or in combination with email server application 22) may allow user 46 to assign one or more downstream response rights to multiple recipients identified within email message 54. Further, as user 46 may assign a unique set of downstream response rights to each recipient identified within email message 54 (or any portion thereof), the propagation of email 54 may be controlled by user 46 at a higher level of granularity. Examples of such downstream response rights may include but are not limited to: restricting the individual ability of users 48, 50, 52 to "reply" to email message 54, restricting the individual ability of users 48, 50, 52 to "reply to all" to email message 54, and restricting the individual ability of users 48, 50, 52 to "forward" email message 54.

When assigning downstream response rights to one or more of the recipients of email message 54 (e.g., users 48, 50, 52), propagation control process 10 (alone or in combination with email server application 22) may be configured to allow e.g., user 46 to assign the downstream response rights to one or more of the recipients of email message 54 prior to sending email message 54 to e.g., users 48, 50, 52. Additionally/alternatively, propagation control process 10 (alone or in combination with email server application 22) may be configured to allow e.g., user 46 to assign the downstream response rights to the recipients of email message 54 subsequent to sending email message 54 to e.g., users 48, 50, 52.

When propagation control process 10 (alone or in combination with email server application 22) is configured to allow e.g., user 46 to assign the downstream response rights to the recipients of email message 54 prior to sending email message 54 to e.g., users 48, 50, 52, user 46 may assign the downstream response rights by e.g., individually selecting the name of the recipient. For example, user 46 may e.g., double-click or right-click "User 52" within BCC field 154. In response to this, propagation control process 10 (alone or in combination with email server application 22) may render pop-up window 170 that may allow user 46 to define the downstream response rights for user 52. For example, pop-up window 170 may allow user 46 to assign downstream response rights for user 52 with respect to their ability to reply to email message 54, reply to all with respect to email message 54, and forward email message 54. Since user 52 is being BCC'd on email message 54, user 46 may select the "reply" check box, thus only allowing user 52 to reply to user 46 (and not to users 48, 50). Further, being that the "forward" check box and "reply to all" check box are not checked, user 52 will not be able to forward email message 54 or reply to all with respect to email message 54.

While pop-up window 170 is shown to define the downstream response rights for an individual recipient, this is for illustrative purposes only and other configurations are possible and are considered to be within the scope of this disclosure and claims. For example, propagation control process 10 (alone or in combination with email server application 22) may render master pop-up window 170' that may allow user 46 to define the downstream response rights for all recipients of email message 54, namely users 48, 50, 52. For example, master pop-up window 170' may initially be rendered in a manner that grants no downstream response rights to users 48, 50, 52. User 46 may then use onscreen pointer 166 to define the rights of the individual users. In one embodiment of master pop-up window 170', master pop-up window 170' may be configured as a matrix in which a column is defined for each of the recipients of email message 54 and a row is defined for each of the individual downstream response rights. User 46 may then e.g., select the appropriate boxes within the matrix to assign the appropriate downstream response rights to the individual recipients of email message 54. As illustrated within pop-up window 170', user 46 may assign "reply" rights to users, 48, 50, 52; "reply to all" rights to users 48, 50; and "forward" rights to only user 48.

In the event that propagation control process 10 (alone or in combination with email server application 22) is configured to allow e.g., user 46 to assign the downstream response rights to the recipients of email message 54 subsequent to sending email message 54 to e.g., users 48, 50, 52, user 46 may assign the downstream response rights by e.g., opening the sent email message (not shown) stored within the sent box of e.g., email client application 24. Once opened, user 46 may individually select the name of the recipient in the manner described above. For example, user 46 may e.g., double-click or right-click "User 52" within the BCC field of the sent email message. In response to this, propagation control process 10 (alone or in combination with email server application 22) may render a pop-up window (similar to pop-up window 170, 170') that may allow user 46 to define the downstream response rights for user 52 (or all recipients) in a fashion similar to the one described above. When the downstream response rights of an email message that has already been sent are altered, the newly-derived downstream response rights may be enacted as an update/refresh of the rights associated with the email message (as originally sent) and may replace the downstream response right of the email message (as originally sent).

Unfortunately and continuing with the above-stated example, in the event that user 52 sends out a "reply", a "reply to all", or a "forward" with respect to email message 54 prior to user 46 assigning the downstream response rights with respect to user 52, the "reply", "reply to all", or "forward" will not be able to be prevented.

Figure 4:
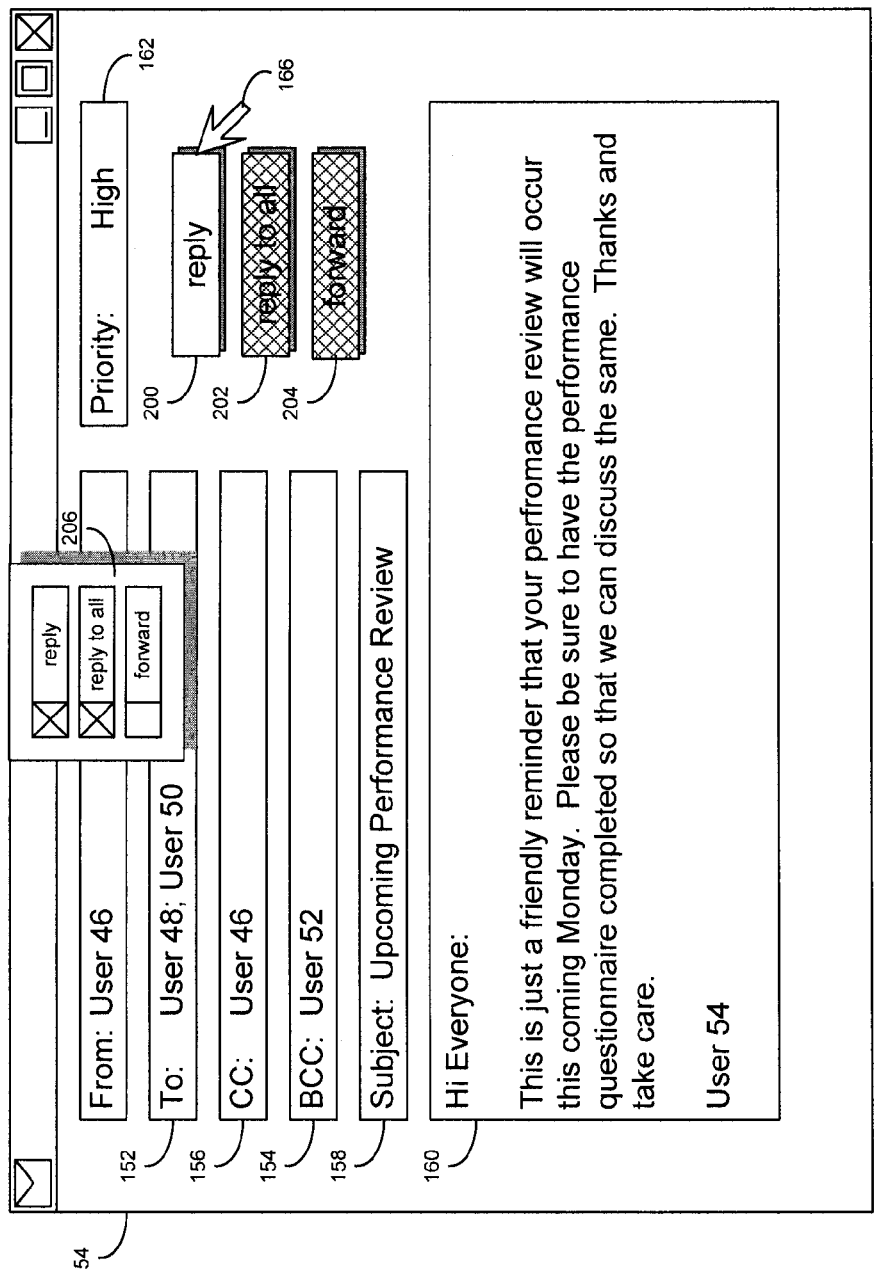
FIG. 4 is a diagrammatic view of an email message as received by a user of the propagation control process of FIG. 1.

Referring also to FIG. 4, once the downstream response rights of the email recipient(s) are assigned by the sender of the email, the manner in which the email message appears to the user may be varied. For example and continuing with the above-stated example, assume that user 52 uses email client application 30 to open and review email message 54. Further assume that propagation control process 10 (alone or in combination with email server application 22) changes the manner in which email message 54 is rendered based upon the downstream response rights assigned by user 46. Assuming that user 46 only granted to user 52 the right to "reply" to a message (i.e., cannot "reply to all" or "forward"), only "reply" button 200 may be selectable by user 52. Further, "reply to all" button 202 and "forward" button 204 may be non-selectable (e.g., grayed-out), thus preventing user 52 from sending out a "reply to all" or a forward".

While buttons 202, 204 are shown to be grayed-out, this is for illustrative purposes only and is not intended to be a limitation of this disclosure, as other configurations are possible and are considered to be within the scope of this disclosure and claims. For example, buttons 202, 204 may merely not be rendered. Alternatively, buttons 202, 204 may be rendered and selectable. However, upon selecting buttons 202, 204, a pop-up window may be rendered stating that e.g., "You do not have the requisite rights to perform this action".

Depending on the manner in which propagation control process 10 is configured, the recipient of email message 54 may be able to determine the rights assigned to the other recipients of email message 54. Specifically and continuing with the above-stated example, user 52 may e.g., double-click or right-click any of the recipients defined within e.g., TO field 152, CC field 156, and BCC field 154. Assume for illustrative purposes that user 52 double-clicked on user 50 (as defined within TO field 152). In response to this, propagation control process 10 (alone or in combination with email server application 22) may render pop-up window 206 that may allow user 52 to determine the downstream response rights assigned by user 46 to user 50. For example, pop-up window 206 may allow user 52 to determine that user 50 was assigned downstream response rights for replying, replying to all, but not forwarding email message 54.

Depending on the manner in which propagation control process 10 is configured, the downstream response rights assigned to an individual with respect to a specific email message may stay with the email message recipient regardless of the manner in which the recipient received the email message in question. For example and as discussed above, email message 54 was sent to user 52 with restricted downstream response rights (i.e., user 52 can only reply and cannot reply to all or forward email message 54). Accordingly, assume for illustrative purposes that user 48 forwards email message 54 to user 52 upon receiving email message 54 from user 46. Upon receiving email message 54 from this second source (i.e., user 48 in addition to the original version sent by user 46), the downstream response rights assigned by user 46 to user 52 will still apply, even to the version of email message 54 that was received by user 52 from user 48.

While the system is described above as allowing a user to double-click or right-click on a recipient's name to assign the downstream response rights of the recipient, this is for illustrative purposes only and is not intended to be a limitation of this disclosure, as other configurations are possible and are considered to be within the scope of this disclosure and claims. For example, at the time email message 54 is sent, propagation control process 10 (alone or in combination with email server application 22) may prompt the author of email message 54 (e.g., user 46) to assign the downstream response rights for the various recipients (e.g., users 48, 50, 52) of email message 54.

While the system is described above as being utilized within an email system, this is for illustrative purposes only and other configurations are possible and are considered to be within the scope of this disclosure and claims. For example and as is known in the art, email messages are often used within a calendaring system to schedule meetings and may include both CC and BCC recipients. Accordingly, propagation control process 10 may be utilized in conjunction with a calendaring server application (not shown) executed on server computer 12. Specifically, propagation control process 10 may be configured to allow user 46 to define an email message that is an invitation to a calendar event. This email message may be addressed to one or more recipients and user 46 may assign downstream response rights to the recipient(s) in the manner discussed above.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
    defining an email message on a first client electronic device that is addressed to a plurality of recipients;
    assigning, on the first client electronic device, a first set of downstream response rights to a first recipient chosen from the plurality of recipients; and
    assigning, on the first client electronic device, a second set of downstream response rights to a second recipient chosen from the plurality of recipients;
    wherein the second set of downstream response rights is different from the first set of downstream response rights;
    wherein one of the first and second sets of downstream response rights that have already been sent are replaced with newly derived downstream rights subsequent to sending the email message to the plurality of recipients.

2. The method of claim 1 further comprising:
    providing the email message to a plurality of client electronic devices associated with the plurality of recipients via a distributed computing network.

3. The method of claim 1 wherein assigning the first set of downstream response rights to the first recipient chosen from the plurality of recipients comprises at least one of:
    restricting the ability of the first recipient to "reply" to the email message;
    restricting the ability of the first recipient to "reply to all" to the email message; and
    restricting the ability of the first recipient to "forward" the email message.

4. The method of claim 1 wherein assigning the second set of downstream response rights to the second recipient chosen from the plurality of recipients comprises at least one of:
    restricting the ability of the second recipient to "reply" to the email message;
    restricting the ability of the second recipient to "reply to all" to the email message; and
    restricting the ability of the second recipient to "forward" the email message.

5. The method of claim 1 wherein the second recipient is chosen from the group consisting of: a "to" recipient; a "cc" recipient, and a "bcc" recipient.

6. A computer program product for assigning downstream rights, the computer program product comprising:
    a computer readable storage medium, wherein the medium does not include a propagating signal, comprising computer usable program code embodied therewith, wherein the computer usable program code comprises computer usable program code configured to:
    define an email message on a first client electronic device that is addressed to a plurality of recipients;
    assign, on the first client electronic device, a first set of downstream response rights to a first recipient chosen from the plurality of recipients; and
    assign, on the first client electronic device, a second set of downstream response rights to a second recipient chosen from the plurality of recipients;
    wherein the second set of downstream response rights is different from the first set of downstream response rights;
    wherein one of the first and second sets of downstream response rights that have already been sent are replaced with newly derived downstream rights subsequent to sending the email message to the plurality of recipients.

7. The computer program product of claim 6 further comprising computer usable program code configured to:
    provide the email message to a plurality of client electronic devices associated with the plurality of recipients via a distributed computing network.

8. The computer program product of claim 6 wherein the computer usable program code for assigning the first set of downstream response rights to the first recipient chosen from the plurality of recipients comprises computer usable program code configured for at least one of:
    restricting the ability of the first recipient to "reply" to the email message;
    restricting the ability of the first recipient to "reply to all" to the email message; and
    restricting the ability of the first recipient to "forward" the email message.

9. The computer program product of claim 6 wherein the computer usable program code for assigning the second set of downstream response rights to the second recipient chosen from the plurality of recipients comprises computer usable program code configured for at least one of:
- restricting the ability of the second recipient to "reply" to the email message;
- restricting the ability of the second recipient to "reply to all" to the email message; and
- restricting the ability of the second recipient to "forward" the email message.

10. The computer program product of claim 6 wherein the second recipient is chosen from the group consisting of: a "to" recipient; a "cc" recipient, and a "bcc" recipient.

11. A client electronic device comprising:
- at least one processor;
- at least one memory architecture coupled with the at least one processor;
- a first software module executed on the at least one processor and the at least one memory architecture, wherein the first software module is configured to define an email message that is addressed to a plurality of recipients;
- a second software module executed on the at least one processor and the at least one memory architecture, wherein the second software module is configured to assign a first set of downstream response rights to a first recipient chosen from the plurality of recipients, wherein the second software module is further configured to perform:
- replacing the first set of downstream response rights that have already been sent with newly derived downstream rights subsequent to sending the email message to the plurality of recipients; and
- a third software module executed on the at least one processor and the at least one memory architecture, wherein the third software module is configured to assign a second set of downstream response rights to a second recipient chosen from the plurality of recipients;
- wherein the second set of downstream response rights is different from the first set of downstream response rights.

12. The client electronic device of claim 11 further comprising a fourth software module executed on the at least one processor and the at least one memory architecture, wherein the fourth software module is configured to:
- provide the email message to a plurality of client electronic devices associated with the plurality of recipients via a distributed computing network.

13. The client electronic device of claim 11, wherein the third software module is further configured to perform:
- replacing the second set of downstream response rights that have already been sent with newly derived downstream rights subsequent to sending the email message to the plurality of recipients.

14. The method of claim 1, wherein the first recipient is chosen from the group consisting of: a "to" recipient, a "cc" recipient, and a "bcc" recipient.

15. The computer program product of claim 6, wherein the first recipient is chosen from the group consisting of: a "to" recipient, a "cc" recipient, and a "bcc" recipient.

16. The client electronic device of claim 11, wherein the first recipient is chosen from the group consisting of: a "to" recipient, a "cc" recipient, and a "bcc" recipient.

17. The client electronic device of claim 11, wherein the second recipient is chosen from the group consisting of: a "to" recipient, a "cc" recipient, and a "bcc" recipient.

* * * * *